United States Patent
Pandurangan et al.

(10) Patent No.: US 12,298,921 B2
(45) Date of Patent: *May 13, 2025

(54) SYSTEMS, METHODS, AND DEVICES FOR ACCESSING A DEVICE OPERATING SYSTEM OVER AN INTERCONNECT

(71) Applicant: Samsung Electronics Co., Ltd., Suwon-si (KR)

(72) Inventors: Rajinikanth Pandurangan, Fremont, CA (US); Changho Choi, San Jose, CA (US); Yang Seok Ki, Palo Alto, CA (US); Sungwook Ryu, Palo Alto, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/513,490

(22) Filed: Nov. 17, 2023

(65) Prior Publication Data
US 2024/0086339 A1    Mar. 14, 2024

Related U.S. Application Data

(63) Continuation of application No. 17/522,899, filed on Nov. 9, 2021, now Pat. No. 11,822,490.
(Continued)

(51) Int. Cl.
   G06F 13/10    (2006.01)
   G06F 9/445    (2018.01)
(52) U.S. Cl.
   CPC ........ G06F 13/102 (2013.01); G06F 9/44505 (2013.01)
(58) Field of Classification Search
   CPC ................ G06F 13/102; G06F 9/44505
(Continued)

(56) References Cited

U.S. PATENT DOCUMENTS 6,330,653 B1    12/2001    Murray et al.
7,984,108 B2    7/2011    Landis et al.
(Continued)

FOREIGN PATENT DOCUMENTS

CN    109564558 A    4/2019
CN    109643299 A    4/2019
(Continued)

OTHER PUBLICATIONS

Anonymous, "Efficient IO With io_uring", Apr. 2019, 16 pages.
(Continued)

*Primary Examiner* — Christopher B Shin
(74) *Attorney, Agent, or Firm* — Renaissance IP Law Group LLP (57) ABSTRACT

A method for communicating with a device may include running, at a device, an operating system, communicating, using a first function of an interconnect, with the device, and communicating, using a second function of the interconnect, with the operating system. The operating system may include communication logic, and the communicating with the operating may include communicating with the communication logic. The communication logic may one or more terminal support drivers, and the communicating with the communication logic may include communicating with the one or more terminal support drivers using a terminal application. The terminal application may run on a host. The second function of the interconnect may be configured to operate with a controller. The communicating with the operating system may include communicating with the operating system based on a privilege information. The host may be a management controller. The method may further include controlling, using the second function of the interconnect, a program on the operating system.

20 Claims, 7 Drawing Sheets

Related U.S. Application Data (60) Provisional application No. 63/255,946, filed on Oct. 14, 2021.

(58) Field of Classification Search
USPC .......................................................... 710/104
See application file for complete search history.

(56) References Cited

U.S. PATENT DOCUMENTS

| | | |
|---|---|---|
| 8,316,156 B2 | 11/2012 | Rucker |
| 8,694,891 B2 | 4/2014 | Kimbuende et al. |
| 9,807,154 B2 | 10/2017 | Darling et al. |
| 9,811,276 B1 | 11/2017 | Taylor et al. |
| 9,923,954 B2 | 3/2018 | Chan et al. |
| 9,942,900 B1 | 4/2018 | Liu et al. |
| 10,394,472 B1 | 8/2019 | Taylor et al. |
| 10,402,363 B2 | 9/2019 | Long et al. |
| 10,555,435 B2 | 2/2020 | White |
| 10,757,251 B1 | 8/2020 | Matula et al. |
| 10,810,074 B2 | 10/2020 | Yu et al. |
| 10,831,454 B2 | 11/2020 | Pathak et al. |
| 10,834,070 B1 | 11/2020 | Santos |
| 10,860,511 B1 | 12/2020 | Thompson et al. |
| 10,872,007 B2 | 12/2020 | Brown et al. |
| 10,996,968 B2 | 5/2021 | Dong et al. |
| 11,216,396 B2 | 1/2022 | Schmisseur et al. |
| 11,822,490 B2 * | 11/2023 | Pandurangan ...... G06F 9/44505 |
| 2009/0113430 A1 | 4/2009 | Riley |
| 2013/0205063 A1 | 8/2013 | Zhang et al. |
| 2014/0372638 A1 | 12/2014 | Anderson et al. |
| 2016/0014280 A1 | 1/2016 | Brunsman et al. |
| 2016/0072693 A1 | 3/2016 | Michaelis |
| 2016/0170790 A1 | 6/2016 | Anand et al. |
| 2017/0062070 A1 | 3/2017 | Moon et al. |
| 2018/0335971 A1 | 11/2018 | Borikar |
| 2019/0155765 A1 | 5/2019 | Lee et al. |
| 2019/0171485 A1 | 6/2019 | Bolkhovitin et al. |
| 2020/0136906 A1 | 4/2020 | Bernat et al. |
| 2020/0356433 A1 | 11/2020 | Kumar et al. |
| 2020/0404069 A1 | 12/2020 | Li et al. |
| 2021/0141351 A1 | 5/2021 | Yang et al. |
| 2021/0200703 A1 | 7/2021 | Simionescu et al. |
| 2021/0373950 A1 | 12/2021 | Sathaye et al. |
| 2024/0086339 A1 * | 3/2024 | Pandurangan ...... G06F 11/3636 |

FOREIGN PATENT DOCUMENTS

| | | |
|---|---|---|
| CN | 112214277 A | 1/2021 |
| EP | 1580569 A1 | 9/2005 |

OTHER PUBLICATIONS

Corbet, Jonathan et al. "Debugging Techniques," Linux Device Drivers: (Where the Kernel Meets the Hardware), XP093020560, 2005, 33 pages.

European Extended Search Report for Application No. 22201058.9, mailed Feb. 16, 2023.

European Office Action for Application No. 22201058.9, mailed Feb. 14, 2024.

Final Office Action for U.S. Appl. No. 17/522,899, mailed Mar. 16, 2023.

Li, Peng et al., "Design of a Storage Processing Unit", 2012 21st International Conference on Parallel Architectures and Compilation Techniques (PACT), 2012, 1 page.

Notice of Allowance for U.S. Appl. No. 17/522,899, mailed Jul. 12, 2023.

Office Action for U.S. Appl. No. 17/522,899, mailed Sep. 2, 2022.

Wikipedia, "Circular Buffer," Oct. 2021, 5 pages.

Wikipedia, "Firmware," XP093020916, 2021, 6 pages.

* cited by examiner

```
[root@localhost ~]# lspci | grep "Manufacturer A"
60:00.0 Non-Volatile memory controller: Manufacturer A NVMe SSD Controller
60:00.1 Non-Volatile memory controller: Manufacturer A Debug Controller
```

SYSTEMS, METHODS, AND DEVICES FOR ACCESSING A DEVICE OPERATING SYSTEM OVER AN INTERCONNECT

REFERENCE TO RELATED APPLICATIONS

This application is a continuation of U.S. patent application Ser. No. 17/522,899, filed Nov. 9, 2021, which claims priority to, and the benefit of, U.S. Provisional Patent Application Ser. No. 63/255,946, filed Oct. 14, 2021 which are both incorporated herein by reference.

TECHNICAL FIELD

This disclosure relates generally to storage systems, and more specifically to systems, methods, and devices for accessing a device operating system over an interconnect.

BACKGROUND

A device such as a storage device, an accelerator device, and/or the like, may include an embedded operating system to run one or more programs that may be used, for example, to perform computations that may be offloaded from a host. The device may be connected to the host with an interconnect that may be used to exchange input and/or output (I/O) data for the program between the host and the device. The embedded operating system may be accessible using a system terminal.

The above information disclosed in this Background section is only for enhancement of understanding of the background of the inventive principles and therefore it may contain information that does not constitute prior art.

SUMMARY

A method for communicating with a device may include running, at a device, an operating system, communicating, using a first function of an interconnect, with the device, and communicating, using a second function of the interconnect, with the operating system. The operating system may include communication logic, and the communicating with the operating may include communicating with the communication logic. The communication logic may include one or more terminal support drivers, and the communicating with the communication logic may include communicating with the one or more terminal support drivers using a terminal application. The terminal application may run on a host. The second function of the interconnect may be configured to operate with a controller. The communicating with the operating system may include communicating with the operating system based on a privilege information. The host may be a management controller. The at least one terminal support driver may provide a command line interface. The method may further include controlling, using the second function of the interconnect, a program on the operating system. The program may include at least one of a debugging program, a tracing program, or a profiling program. The communicating with the operating system may include communicating using a connection. The communicating with the operating system may include storing, by the device, in a buffer, output data associated with the second function of the interconnect. The communicating with the operating system may include reading, by a user, from the buffer, the output data associated with the second function of the interconnect. The buffer may include a ring buffer. The output data associated with the second function of the interconnect may be generated by a terminal. The output data associated with the second function of the interconnect may be generated by a program controlled using the second function of the interconnect. The buffer may be located, at least partially, at the device. The buffer may be located, at least partially, at a host. The communicating with the operating system may include communicating using a virtual terminal.

A device may include an interconnect interface, a device controller configured to communicate using a first function of the interconnect interface, and a processor configured to run an operating system, wherein the operating system may be configured to communicate using a second function of the interconnect interface. The device controller may be integral with the processor. The device may further include a buffer configured to store output data associated with the second function of the interface, and send the output data using the second function of the interconnect interface. The buffer may include a ring buffer. The operating system may include communication logic configured to communicate using the second function of the interconnect interface.

A system may include a device including: a device controller configured to communicate using a first function of an interconnect, and a processor configured to run an operating system configured to communicate using a second function of the interconnect, and at least one host including at least one processor configured to: communicate, using the first function of the interconnect, with the device, and communicate, using the second function of the interconnect, with the operating system. The at least one host may include a first host including a first processor configured to communicate, using the first function of the interconnect, with the device, and a second host including a second processor configured to communicate, using the second function of the interconnect, with the operating system. The first host may include a management controller. The at least one host processor may be configured to provide communication between the operating system and a user using a remote access protocol.

A host device may include an interconnect interface, and at least one processor configured to communicate, using a first function of the interconnect interface, with a device, and communicate, using a second function of the interconnect interface, with communication logic at the device, wherein the communication logic may be configured to access an operating system running at the device. The host device may further include a driver configured to interface the processor to the interconnect interface. The at least one processor may be configured to communicate with the communication logic using a terminal application. The host device may include a management controller. The at least one processor may be configured to provide communication between the operating system and a user using a remote access protocol.

BRIEF DESCRIPTION OF THE DRAWINGS

The figures are not necessarily drawn to scale and elements of similar structures or functions may generally be represented by like reference numerals or portions thereof for illustrative purposes throughout the figures. The figures are only intended to facilitate the description of the various embodiments described herein. The figures do not describe every aspect of the teachings disclosed herein and do not limit the scope of the claims. To prevent the drawings from becoming obscured, not all of the components, connections, and the like may be shown, and not all of the components may have reference numbers. However, patterns of component configurations may be readily apparent from the drawings. The accompanying drawings, together with the specification, illustrate example embodiments of the present disclosure, and, together with the description, serve to explain the principles of the present disclosure.

DETAILED DESCRIPTION

A device such as a storage device, an accelerator device, and/or the like, may include an embedded operating system to run one or more programs that may be used, for example, to perform computations that may be offloaded from a host. The device may be connected to the host with an interconnect such as Peripheral Component Interconnect Express (PCIe). The host and the device may use the interconnect to exchange input and/or output (I/O) data for the program. The embedded operating system may support a terminal that may enable a user to run one or more programs for monitoring and/or troubleshooting the program such as a tracing program, a debugging program, a profiling program, and/or the like. However, the terminal may not be able to access the operating system through the interconnect. Thus, the user may only be able to access these features by connecting additional hardware to the device.

A device in accordance with example embodiments of the disclosure may enable a user to access an embedded operating system through an interconnect. In some embodiments, a device may expose one or more features of an operating system through an interconnect by using an additional function of the interconnect. For example, a storage device may have a storage device controller configured to use a first function of an interconnect. The storage device may use the first function to send and receive data related to its normal operation as a storage device through the interconnect. An embedded operating system running on the storage device may be configured to use a second function of the interconnect. Thus, a user (e.g., one or more programs running on a host) may access the operating system using the same interconnect used to send storage data to and/or from the storage device. Depending on the implementation details, this may enable a user to access the embedded operating system with little or no additional hardware. Depending on the implementation details, this may also enable a user to access any type of feature made available by the operating system using the second function such as programs for debugging, tracing, profiling, file transfers, software updates, firmware updates, and/or the like.

In some embodiments, a device may include communication logic that may enable an embedded operating system running on the device to be accessed through an interconnect. In some embodiments, a host may use a terminal application to access the embedded operating system through an interconnect. For example, the device may include communication logic (that may include, e.g., at least one terminal support driver) that may enable a terminal (e.g., a virtual terminal) to establish a connection over an interconnect such as PCIe and/or associated protocols. The host may include a driver that may enable the terminal application to connect to the embedded operating system through the interconnect. In some embodiments, the communication logic may enable a user to access one or more features of the operating system based on a privilege level of the user.

In some embodiments, a device and a host may be configured to exchange data using a producer-consumer scheme. In some embodiments of a producer-consumer scheme, a producer may generate data that may be used by a consumer. For example, a program controlled using communication logic may operate as a producer and store output data in a buffer (e.g., a ring buffer). The user (e.g., an application running on a host) may operate as a consumer and retrieve the output data from the buffer.

Figure 1:
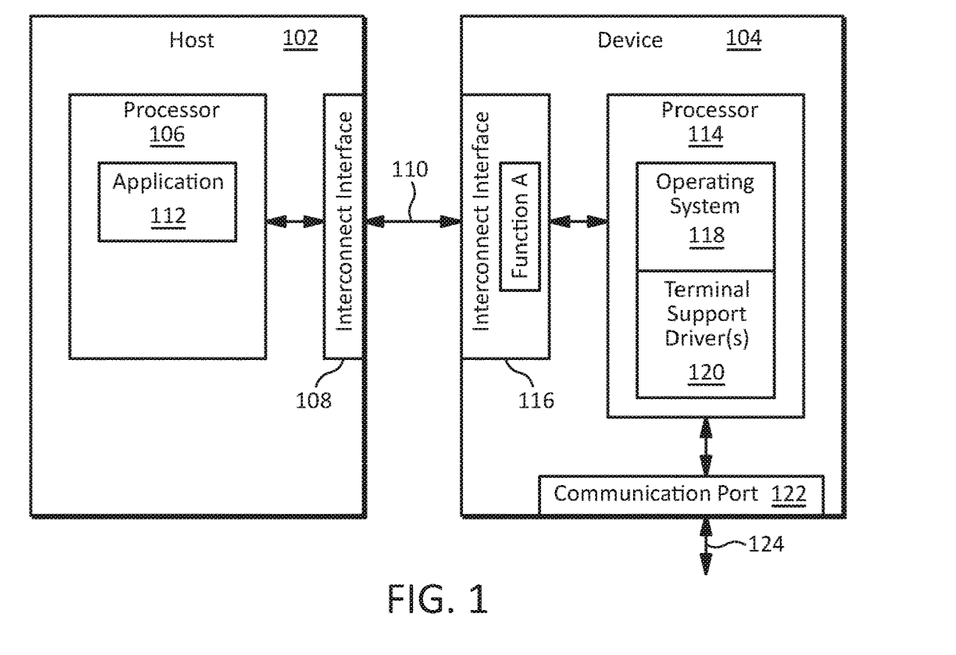
FIG. 1 illustrates an embodiment of a system in accordance with example embodiments of the disclosure.

FIG. 1 illustrates an embodiment of a system in accordance with example embodiments of the disclosure. The system illustrated in FIG. 1 may include a host 102 and a device 104. The host 102 may include one or more processors 106 and an interconnect interface 108 that may enable the host 102 to communicate with the device 104 through an interconnect fabric 110. The host 102 may be configured to run an application 112 that may relate to a primary functionality of the device 104. For example, if the device 104 is a storage device, the application 112 may be a storage application. As another example, if the device 104 is a network interface card (NIC), the application 112 may be a networking application.

The device 104 may be implemented as any type of device such as a storage device, an accelerator, a NIC, and/or the like or any combination thereof. The device 104 may include one or more processors 114 and an interconnect interface 116. The processor 114 may be configured as a function Function A of the interconnect implemented by the interconnect interface 116. For example, if the interconnect interface 116 is implemented with PCIe, the processor 114 may be configured as function 0. The processor 114 may be configured to run an embedded operating system 118 having one or more terminal support drivers 120 that may enable the embedded operating system 118 to be accessed using a terminal and/or terminal application. For example, if the operating system 118 is implemented with embedded Linux, the one or more terminal support drivers 120 may enable a Linux console to access (e.g., provide input to and/or output from) the Linux kernel.

In some embodiments, the host 102 may not be able to access the embedded operating system 118 through the interconnect interface 116. Thus, to access the embedded operating system 118 (e.g., to collect debug logs of firmware in the device 104), the user may connect additional hardware to the device 104, for example, using a communication port 122 (e.g., a universal asynchronous receiver-transmitter (UART)) that may be accessed through a communication connection 124 (e.g., a serial connection), using other debug tools and/or software hooks with debugging through ports such as a Joint Test Action Group (JTAG) and/or Serial Wire Debug (SWD) connection. However, the use of additional hardware may be expensive and/or difficult to implement, especially for example, with a device at a remote location.

Figure 2:
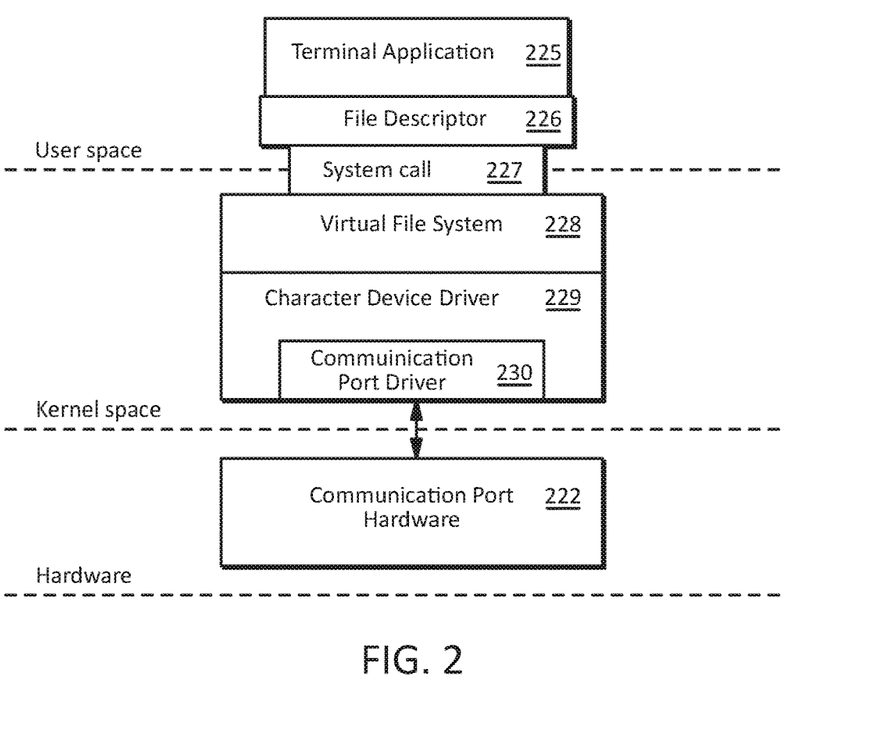
FIG. 2 illustrates an example embodiment of a software stack for implementing a hardware connection to a terminal in accordance with example embodiments of the disclosure.

FIG. 2 illustrates an example embodiment of a software stack for implementing a hardware connection for a terminal in accordance with example embodiments of the disclosure. The embodiment illustrated in FIG. 2 may be used, for example, by any apparatus (e.g., a host) to connect to the communication port 122 shown in FIG. 1. For purposes of illustration, the embodiment illustrated in FIG. 2 may be described in the context of a Linux operating system, but a similar stack may be implemented with any operating system.

Referring to FIG. 2, the software stack may include a terminal application 225 configured to access a communication port 222 that may be represented as a file descriptor 226. The terminal application 225 may access the communication port 222 through a system call 227 to a virtual file system (VFS) 228. The virtual file system 228 may handle the system call by calling an associated function in a character device driver 229. The character device driver 229 may include a communication port driver 230 that may read and/or write data to and/or from a hardware buffer register in the communication port 222.

Figure 3:
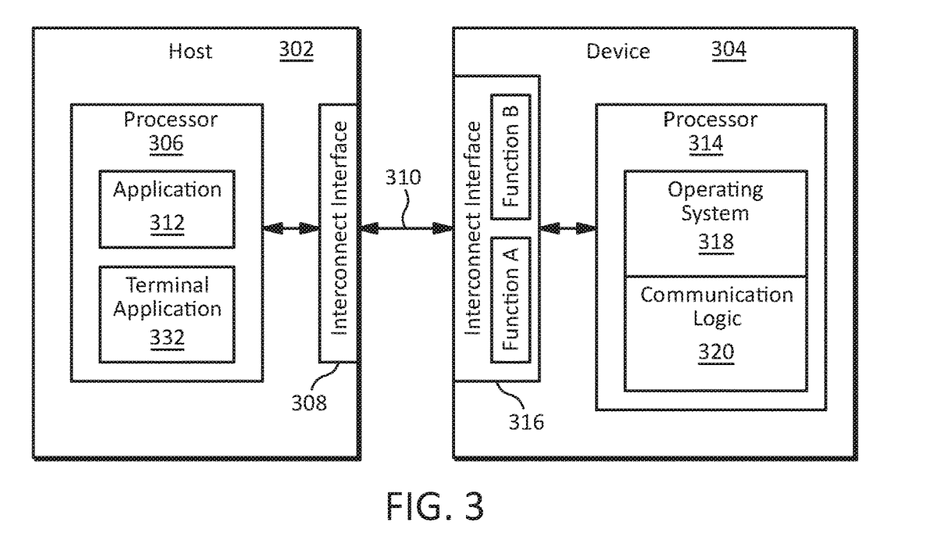
FIG. 3 illustrates an embodiment of a system that may provide a user with access to an embedded operating system of a device in accordance with example embodiments of the disclosure.

FIG. 3 illustrates an embodiment of a system that may provide a user with access to an embedded operating system in accordance with example embodiments of the disclosure. The system illustrated in FIG. 3 may include components similar to those illustrated in FIG. 1 in which references numerals ending in the same digits may indicate components that may perform similar functions. However, in the embodiment illustrated in FIG. 3, communication logic 320 may be configured to expose one or more features of an operating system 318 using a second function Function B of the interconnect implemented by the interconnect interface 316.

For example, if the interconnect interface 316 is implemented with PCIe, a device controller (which may be implemented, for example, by the processor 314) may be configured to use function 0, and the communication logic 320 may be configured to expose another controller (e.g., a debug controller) using function 1.

In the embodiment illustrated in FIG. 3, the host processor 306 may be configured to run a terminal application 332 that may enable a user (e.g., an application running on the host 302) to access the operating system 318 through the interconnect interfaces 308 and 316. For example, the terminal application 332 may be used to monitor and/or troubleshoot a user application such as a computational storage (CS) program running on the operating system 318 by launching, through the communication logic 320, a program (e.g., a utility) for debugging, tracing, profiling, and/or the like, the user application. Depending on the implementation details, this may enable a user to access some or all of the features provided by the embedded operating system 318 without using additional hardware such as the communication port shown in FIG. 1.

Figure 4:
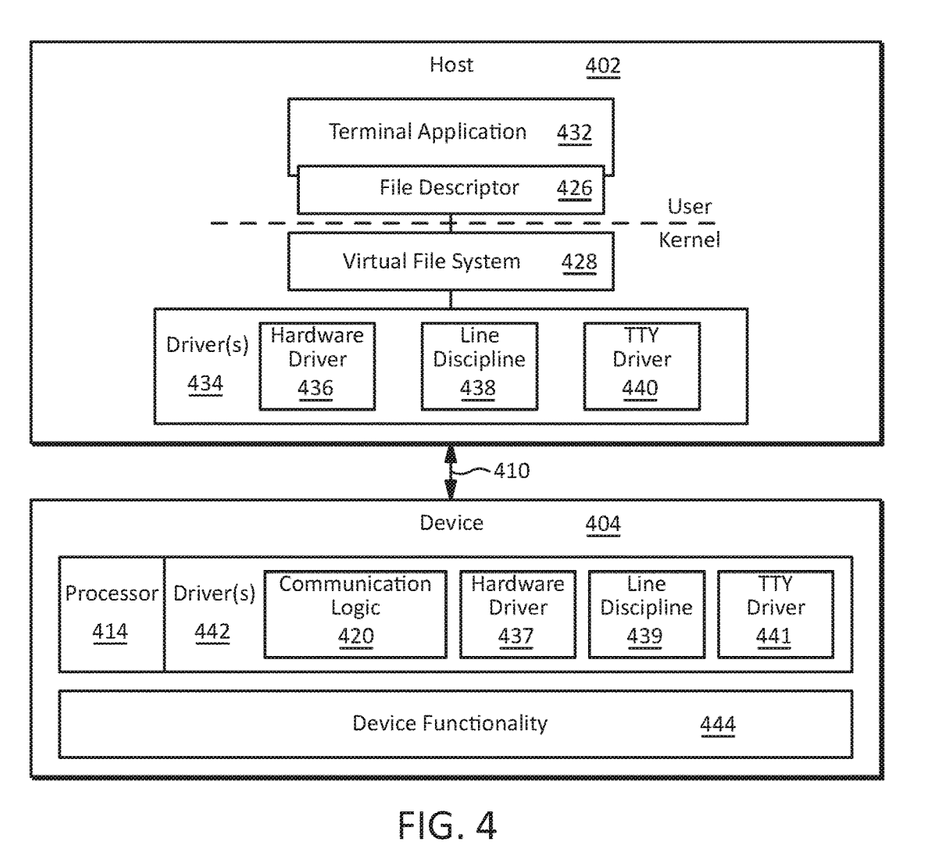
FIG. 4 illustrates an example embodiment of a driver configuration in a system having access to a device operating system through an interconnect in accordance with example embodiments of the disclosure.

FIG. 4 illustrates an example embodiment of a driver configuration in a system having access to a device operating system through an interconnect in accordance with example embodiments of the disclosure. The driver configuration illustrated in FIG. 4 may be implemented, for example, to support data flow in any of the embodiments having access to a device operating system through an interconnect disclosed herein including those described with respect to FIG. 3, FIG. 5, FIG. 9, FIG. 10, FIG. 11, and/or FIG. 12.

Referring to FIG. 4, a host 402 and a device 404 may be connected through interconnect fabric 410. The host 402 may include a terminal application 432, a virtual file system 428, and one or more drivers 434. The one or more drivers 434 may include a hardware driver 436 for the interconnect fabric 410, line discipline 438, and/or a teletype (TTY) driver 440. The terminal application 432 may communicate with the one or more drivers 434 through the virtual file system 428 using a file descriptor 426. The one or more drivers 434 may enable the terminal application 432 to communicate over the interconnect fabric 410, for example, through an interconnect interface such as interconnect interface 308 illustrated in FIG. 3. In some embodiments, the one or more drivers 434 may be implemented by adding the functionality of the drivers 434 to an existing device driver for the device 404. In such an embodiment, the hardware driver 436 may already be present in the existing device driver for the device 404.

The device 404 may include one or more processors 414, one or more drivers 442, and device functionality 444. The device functionality 444 may implement one or more primary functionalities of the device 404 such as a storage controller and storage media for a storage device, one or more compute resources for a computational storage device, one or more processing resources for an accelerator, network interface hardware for a NIC, and/or the like. In some embodiments, the device functionality 444 may be accessed using a first function of an interconnect communicating over the interconnect fabric 410.

The one or more drivers 442 may enable an operating system running on the one or more processors 414 to communicate over the interconnect fabric 410, for example, through an interconnect interface such as interconnect interface 316 illustrated in FIG. 3. The one or more drivers 442 may include communication logic 420 that may be configured to provide access to an operating system running on the processor 414 using a second function of an interconnect communicating over the interconnect fabric 410. The one or more drivers 442 may also include a hardware driver 437 for the interconnect fabric 410, line discipline 439, and/or a teletype (TTY) driver 441. Although shown as a separate component in FIG. 4, in some embodiments, the communication logic 420 may be partially or entirely integrated with one or more of the hardware driver 437, the line discipline 439, and/or the teletype (TTY) driver 441. In some embodiments, the communication logic 420 may include one or more terminal support drivers.

In some embodiments, the one or more drivers 442 may implement one or more devices (e.g., one or more controllers) such as a debug device, debug communication (dbgCOMM) device, a USB debug device (dbgUSB), a computational storage Nonvolatile Memory Express (NVMe) debug (dbgCSNVMe) device, and/or the like. In some embodiments, the one or more drivers 442 may implement a software communication (software COMM) port that may expose (e.g., make accessible to a user such as an application running on the host 402) one or more features of an operating system running on the device 404.

An example operation in which the host 402 may access a device operating system in accordance with example embodiments of the disclosure using the system the system illustrated in FIG. 4 may proceed as follows. The host 402 may receive a command from a user through the terminal application 432. The command may be processed by the host stack illustrated in FIG. 4, e.g., using a virtual file descriptor 426 through the virtual file system 428. The command may be transferred, using one or more of the drivers 434, from the host 402 to the device 404 through the interconnect fabric 410 using a function of the interconnect other than a function used for normal operation of the device 404. At the device 404, the command may be processed by the device stack, for example, using one or more of the drivers 442 (e.g., communication logic 420 implemented with one or more terminal support drivers) which may pass the command to the operating system kernel. The operating system kernel may then execute the command. One or more outputs of the command (e.g., debugging logs, performance profiles, calculations, and/or the like) may be transferred back to the user through the terminal application 432 using a process that may essentially be the reverse of sending the command. Thus, the one or more outputs may be processed by the device stack using one or more of the drivers 442 (e.g., a terminal support driver) which may transfer the one or more outputs through the interconnect fabric 410 using a function of the interconnect other than a function used for normal operation of the device 404. At the host 402, the one or more outputs of the command may be processed by the host stack using one or more of the drivers 434. The one or more outputs may then be passed to the terminal application 432 by the virtual file system 428 using a file descriptor 426.

In some embodiments, one or more of the drivers 442 may be implemented by adding the functionality of the driver to an existing driver for an interconnect interface in device 404. In such an embodiment, the hardware driver 437 may already be present in an existing driver for the device 404. In some embodiments, the one or more drivers 442 may be configured to enable a user to access one or more features of the operating system based on a privilege level of the user.

Figure 5:
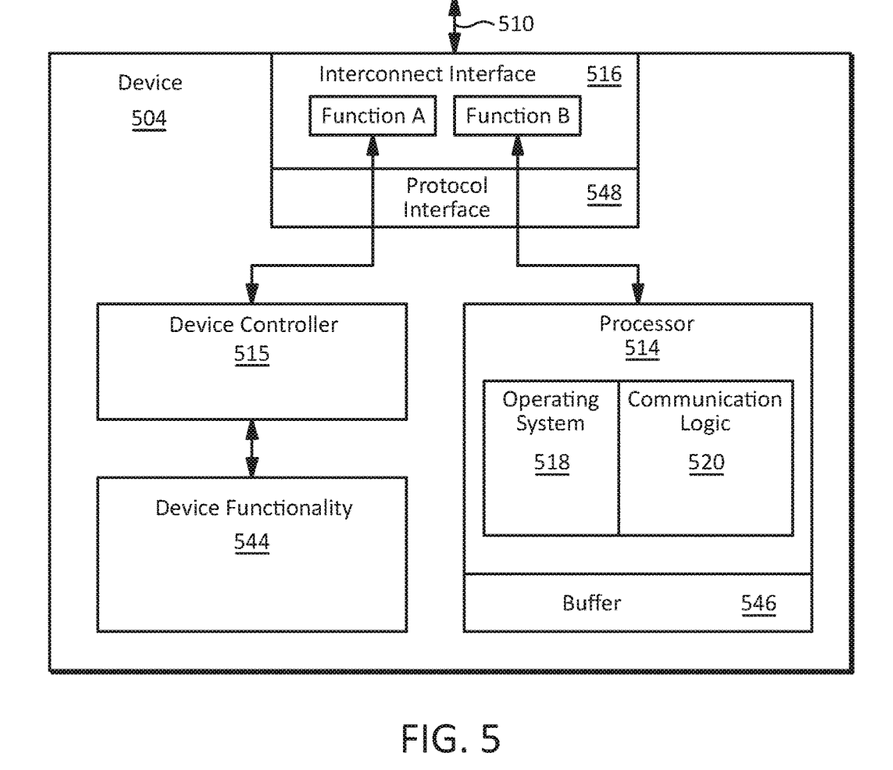
FIG. 5 illustrates a more detailed example embodiment of a device that may provide a user with access to an embedded operating system of a device through an interconnect in accordance with example embodiments of the disclosure.

FIG. 5 illustrates a more detailed example embodiment of a device that may provide a user with access to an embedded operating system of a device through an interconnect in accordance with example embodiments of the disclosure. The device illustrated in FIG. 5 may be used, for example, to implement any of the devices illustrated herein, including those illustrated in FIG. 3, FIG. 4, FIG. 9, FIG. 10, and/or FIG. 12.

Referring to FIG. 5, the device 504 may include an interconnect interface 516, a device controller 515, device functionality 544, and one or more processors 514.

In some embodiments, the device controller 515 may be configured to use a first function Function A of the interconnect interface 516, and the one or more processors 514 may run an operating system 518 having communication logic 510 that may expose one or more features of the operating system 518 using a second function Function B of the interconnect interface 516. For example, if the interconnect interface 516 is implemented with PCIe, the device controller 515 may implement function 0, and the communication logic 520 may implement function 1. In some embodiments (e.g., a PCIe implementation), the first and second functions Function A and Function B may be handled by the interconnect as separate (e.g., logical) devices even though they may be implemented with the same physical device. In some embodiments, the communication logic 520 may include one or more terminal support drivers.

Some embodiments may further include a protocol interface 548 which, for example, may implement a communication protocol on top of, or integral with, the interface implemented by the interconnect interface 516. The interconnect interface 516 and/or protocol interface 548 may implement any interconnects and/or storage protocols including Peripheral Component PCIe, NVMe, NVMe-over-fabric (NVMe-oF), Ethernet, Transmission Control Protocol/Internet Protocol (TCP/IP), remote direct memory access (RDMA), RDMA over Converged Ethernet (ROCE), FibreChannel, InfiniBand, Serial ATA (SATA), Small Computer Systems Interface (SCSI), Serial Attached SCSI (SAS), iWARP, and/or the like, or any combination thereof. For example, in an embodiment in which the device 504 is implemented as a storage device, the interconnect interface 516 may implement a PCIe interconnect, and the protocol interface 548 may implement an NVMe protocol.

In some embodiments, the interconnect interface 516, protocol interface 548, and/or other components of the device 504 may implement a coherent (e.g., memory coherent, cache coherent, and/or the like) or memory semantic interface such as Compute Express Link (CXL), and/or a coherent protocol such as CXL.mem, CXL.cache, and/or CXL.IO. Other examples of coherent and/or memory semantic interfaces and/or protocols may include Gen-Z, Coherent Accelerator Processor Interface (CAPI), Cache Coherent Interconnect for Accelerators (CCIX), and/or the like.

The device functionality 544 may implement one or more primary functionalities of the device 504 such as storage media for a storage device, one or more compute resources for a computational storage device, one or more processing resources for an accelerator, network interface hardware for a NIC, and/or the like. The device controller 515 may control access to, and/or the operation of, the device functionality 544. For example, the device controller may be implemented as a storage device controller if the device 504 is implemented as a storage device. Additionally, or alternatively, the device controller 515 may be implemented as a compute resource controller if the device 504 is implemented as a computational storage device. As another example, the device controller 515 may be implemented as a media access controller (MAC) if the device 504 is implemented as a NIC.

In some embodiments, the communication logic 520 may enable a virtual terminal to access the operating system 518. For example, if the operating system 518 is implemented with embedded Linux, a Linux console may provide access to the Linux kernel, e.g., using the virtual terminal (VT) subsystem of the Linux kernel.

In some embodiments, some or all of the communication logic 520 may be implemented as one or more kernel modules. For example, in an embodiment in which the operating system 518 is implemented with embedded Linux, the communication logic 520 may include one or more terminal support drivers that may be implemented as Linux kernel modules, which may be one or more pieces of code that may be loaded on demand and extend the functionality of the Linux kernel.

Some embodiments may further include one or more buffers 546 that may be used to buffer data exchanged between a host and the operating system 518, or a program that may be controlled (e.g., started, monitored, and/or the like) using the communication logic 520. In some embodiments, the host and device 504 may be configured in a producer-consumer model. For example, a process controlled using the communication logic 520, may operate as a producer and store output data in the one or more buffers (e.g., a ring buffer) 546. A process such as a user process (e.g., an application running on a host) may operate as a consumer and retrieve output data from the one or more buffers 546.

Any of the components illustrated in FIG. 5 including the interconnect interface 516, device controller 515, device functionality 544, and one or more processors 514, communication logic 520, protocol interface 548, and/or buffer 546 may be implemented with software, hardware, or any combination thereof including combinational logic, sequential logic, one or more timers, counters, registers, and/or state machines, any type of memory including volatile memories such as dynamic random access memory (DRAM) and/or static random access memory (SRAM), any type of nonvolatile memory including nonvolatile random access memory (NVRAM), flash memory, persistent memory, and/or the like or any combination thereof, one or more complex programmable logic devices (CPLDs), field programmable gate arrays (FPGAs), application specific integrated circuits (ASICs), central processing units (CPUs) such as complex instruction set computer (CISC) processors such as x86 processors and/or reduced instruction set computer (RISC) processors such as ARM processors, graphics processing units (GPUs), neural processing units (NPUs), tensor processing units (TPUs) and/or the like, executing instructions stored in any type of memory, or any combination thereof. In some embodiments, one or more components may be implemented as a system-on-chip (SOC).

In some embodiments, the interconnect interface 516 may include circuitry such as one or more transmitters, receivers, buffers, and/or the like to communicate with one or more hosts and/or other devices through the fabric 510. In some embodiments, any of the device functionality 544 may include fixed and/or programmable functionality to perform any functions such as compression and/or decompression, encryption and/or decryption, microservices, erasure coding, video encoding and/or decoding, database acceleration, search, machine learning, graph processing, and/or the like.

In some embodiments, some or all of the functionality of the interconnect interface 516, the protocol interface 548, the device controller 515, the one or more processors 514, the buffer 546, and/or the device functionality 544 may be integrated into a single component. For example, if the device 504 is implemented as a storage device, the device controller 515, and at least one of the one or more processors may be integrated in a single component. As another example, if the device 504 is implemented as a computational storage device, one or more compute resources in the device functionality 544 (e.g., one or more processing elements that may be configured to perform computations on data stored in storage media at the device 504) may be implemented as an FPGA, ASIC, and/or the like on which the operating system 518 may run.

In some embodiments, any of the terminal applications and/or terminals disclosed herein may implement connection-based and/or connectionless communications.

In some embodiments, accessing an operating system on a device through an interconnect may enable a user to some or all of the features provided by the operating system through a terminal including any or all of the following: a command line interface to a kernel of the operating system, resources to trace, debug, profile, and/or the like, a program running on the operating system (e.g., GNU debugger (GDB), ltrace, strace, dmesg, top, cpuinfo, ebpf tools, and/or the like), access to log messages (e.g., debug logs) from programs, management of the device (e.g., resources, configuration, and/or operation), and/or the like. Depending on the implementation details, one or more of these features may be accessed through an interconnect without the use of additional hardware such as a cable.

In some embodiments, accessing an operating system on a device through an interconnect may be especially beneficial with a device that may run microservices. For example, accessing the device operating system in accordance with example embodiments of the disclosure may enable a user to monitor and/or debug each microservice individually. Moreover, accessing the device operating system in accordance with example embodiments of the disclosure may enable a user to manage and/or control the microservices, for example, to start and/or halt one or more microservices (individually and/or in specific groups), configure microservices (individually and/or in specific groups), and/or the like.

Figure 6:
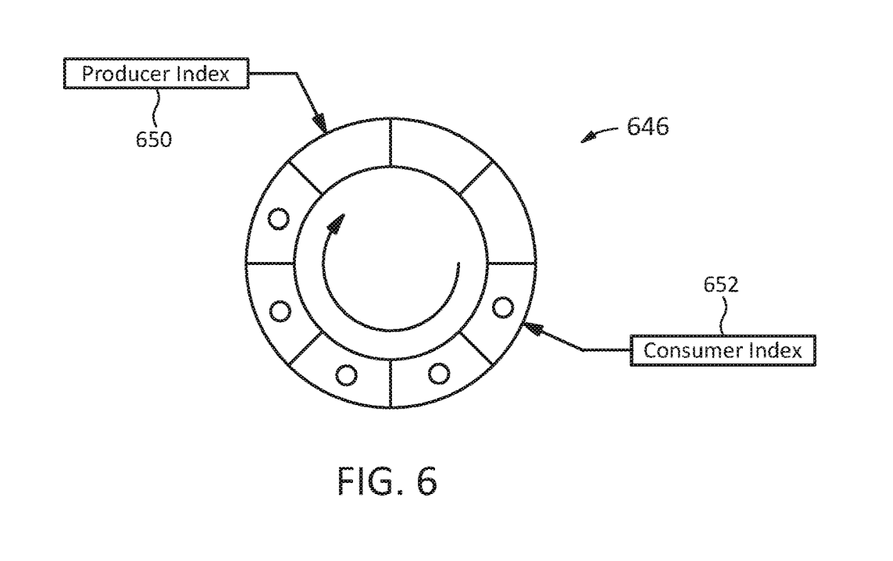
FIG. 6 illustrates an example embodiment of a ring buffer scheme in accordance with example embodiments of the disclosure.

FIG. 6 illustrates an example embodiment of a ring buffer scheme in accordance with example embodiments of the disclosure. The embodiment illustrated in FIG. 6 may be used, for example, to implement the one or more buffers 546 illustrated in FIG. 5.

Referring to FIG. 6, the ring buffer 646 may be implemented with memory locations (e.g., contiguous memory locations) that may be arranged as a ring (e.g., a bounded buffer) by looping the addressing of the beginning memory location to the ending memory address. In some embodiments, a host and device may be configured in a producer-consumer model. For example, a program controlled using communication logic may operate as a producer and store output data in the ring 646 buffer. The user (e.g., an application running on a host) may operate as a consumer and retrieve output data from the ring buffer 646.

The ring buffer 646 may operate by placing new entries (e.g., output data such as logs and/or debug messages) into the ring buffer 646 at a memory location pointed to by a producer index 650. A dot may indicate an occupied memory location. The producer index 650 may be incremented to point to the next available memory location each time a new entry is placed in the ring buffer 646. Entries may be read from the ring buffer 646 at a memory location pointed to by a consumer index 652. In some embodiments, the producer (e.g., a host) may ensure that it reads data from the location pointed to by the consumer index 652 before that location is overwritten with a new entry. If the producer index 650 and the consumer index 652 point to the same location, it may indicate that the ring buffer 646 is empty. In some embodiments, the ring buffer 646 may be located at a shared memory location that may be accessible to the host and the device. In some embodiments, the ring buffer 646 may be located at the host, at some other location, or distributed between multiple locations.

In some embodiments, the ring buffer 646 may notify a user (e.g., an application running on a host) that output data is available, for example, through a doorbell function which may be implemented with an interrupt (e.g., a message signaled interrupt (MSI)), a status bit in a status register, and/or the like.

Figure 7A:
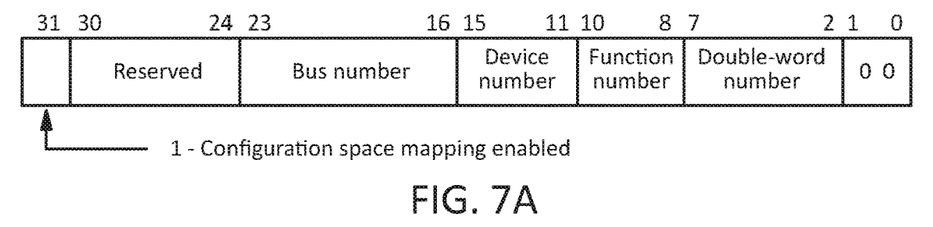
FIG. 7A illustrates an example embodiment of a device register for a device in accordance with example embodiments of the disclosure.

FIG. 7A illustrates an example embodiment of a device register for a device in accordance with example embodiments of the disclosure. For purposes of illustration, the embodiment illustrated in FIG. 7A may be described in the context of a PCIe register, but the principles may be applied to any type of interconnect. In the embodiment illustrated in FIG. 7A, the three bits identified as Function Number may identify the function associated with a specific feature of a device. For example, if the embodiment of a device 504 illustrated FIG. 5 is illustrated with PCIe, a first register for the first function Function A configured for the storage device controller 515 may have bits 000 (function 0) at bit locations 8-10, and a second register for the second function Function B configured for the communication logic 520 may have bits 001 (function 1) at bit locations 8-10.

Figure 7B:
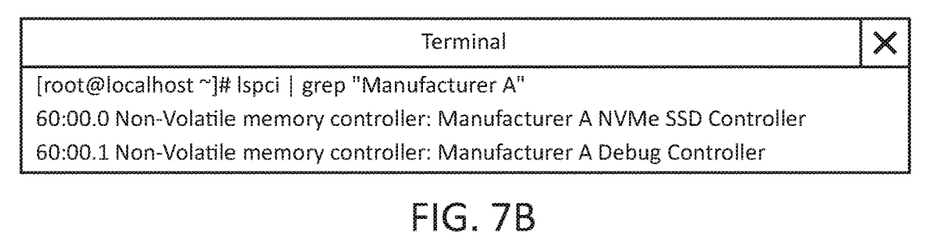
FIG. 7B illustrates an example embodiment of a query command and resulting output for a system having a device and device operating system that may be accessed using functions of an interconnect in accordance with example embodiments of the disclosure.

FIG. 7B illustrates an example embodiment of a query command and resulting output for a system having a device and device operating system that may be accessed using functions of an interconnect in accordance with example embodiments of the disclosure. For purposes of illustration, the embodiment illustrated in FIG. 7B illustrates a command line interface in which a command lspci is used to determine the PCIe configuration of a system such as that illustrated in FIG. 5 running a Linux operating system, but other interconnects and/or operating systems may be used.

Referring to FIG. 7B, the first line illustrates the command lspci used with a pipeline through a filter (e.g., grep) to narrow the results to entries from Manufacturer A. The output on the following two lines may have the following format: [bus]:[slot].[function] [class]:[vendor and product]. Thus, the second line shows that a device controller (e.g., device controller 515 illustrated in FIG. 5) may be configured for bus 60, slot 0, function 0 as a class of Non-Volatile memory controller from Manufacturer A as an NVMe SSD Controller. The third line shows that a debug controller (e.g., implemented by processor 514 using communication logic 520 illustrated in FIG. 5) may be configured for bus 60, slot 0, function 1 as a class of Non-Volatile memory controller from Manufacturer A as a debug controller.

Figure 8:
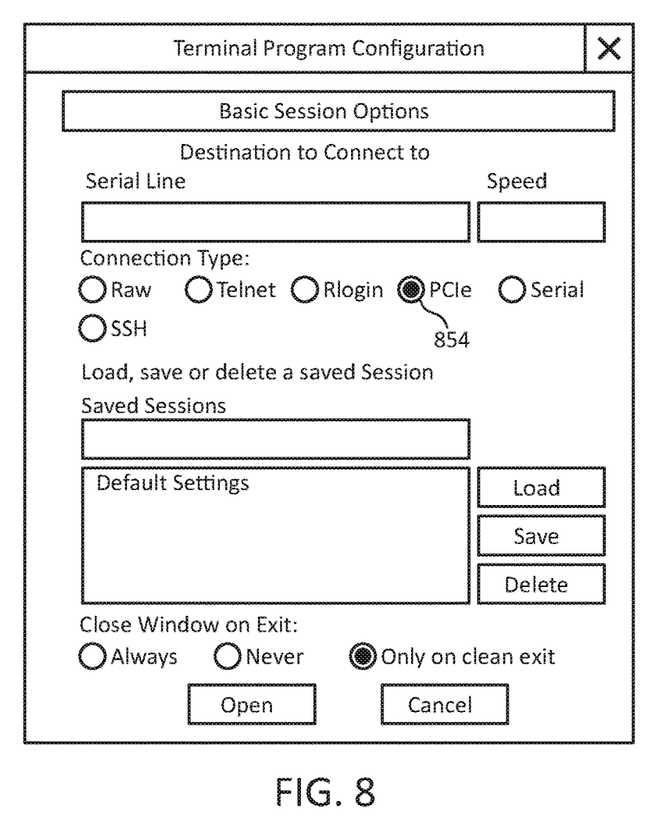
FIG. 8 illustrates an example embodiment of a user interface for a terminal program that may be used to access a device operating system through an interconnect in accordance with example embodiments of the disclosure.

FIG. 8 illustrates an example embodiment of a user interface for a terminal program (which may also be referred to as a terminal application) that may be used to access a device operating system through an interconnect in accordance with example embodiments of the disclosure. For purposes of illustration, the embodiment illustrated in FIG. 8 may be illustrated in the context of a PCIe interconnect and implemented by modifying an existing terminal program such as PuTTY, but a terminal program for accessing a device operating system through an interconnect may be implemented with any other modified and/or custom software for any type of interconnect. Referring to FIG. 8, the terminal program may provide a user with an option to connect to a device operating system using PCIe as shown by the radio button 854.

Figure 9:
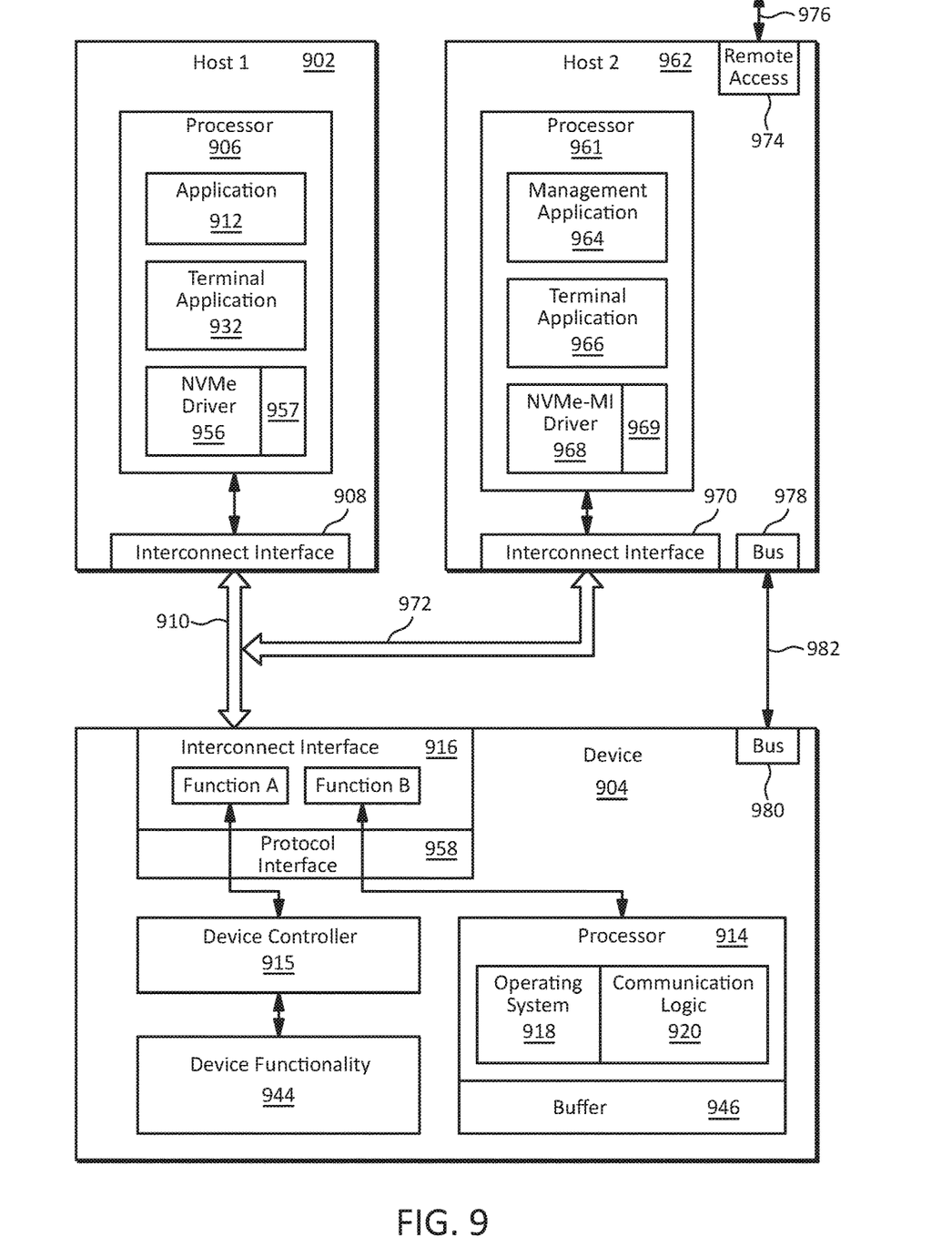
FIG. 9 illustrates an example embodiment of a system in which a management interface may be used to access an embedded operating system of a device through an interconnect in accordance with example embodiments of the disclosure.

FIG. 9 illustrates an example embodiment of a system in which a management interface may be used to access a device embedded operating system through an interconnect in accordance with example embodiments of the disclosure. The embodiment illustrated in FIG. 9 may include a first host 902, a second host 962, and a device 904. The first host 902 and the device 904 may be connected through an interconnect fabric 910. The second host 962 and the device 904 may be connected through an interconnect fabric 972, which, in some embodiments, may be an extension of fabric 910.

The first host 902 may include some components similar to those illustrated in FIG. 3 in which references numerals ending in the same digits may indicate components that may perform similar functions. However, the first host 902 illustrated in FIG. 9 may include an NVMe driver 956 configured to implement an NVMe protocol on top of a PCIe interconnect implemented by the interconnect interface 908. The NVMe driver 956 may include a portion 957 that may enable the terminal application 932 to access the operating system 918 running on device 904 as a second function Function B through the PCIe interface 908. The second function Function B may be implemented, for example, by communication logic 920 of the operating system 918. In some embodiments, the portion 957 of the NVMe driver 956 may be integral with, or implemented in a similar manner as, the one or more drivers 434 illustrated in FIG. 4.

The device 904 may include some components similar to those illustrated in FIG. 5 in which references numerals ending in the same digits may indicate components that may perform similar functions. However, the device 904 illustrated in FIG. 9 may include a bus interface 980. Moreover, in the device 904 illustrated in FIG. 9, the protocol interface 958 may implement an NVMe and NVMe Management Interface (NVMe-MI) protocol on top of a PCIe interconnect implemented by the interconnect interface 916. In some embodiments, the NVMe and NVMe-MI interface 948 may have a driver that is integral with, or implemented in a similar manner as, the one or more drivers 442 illustrated in FIG. 4.

The second host 962 may be implemented as a management controller such as a baseboard management controller (BMC). The second host 962 may include one or more processors 961, an interconnect interface 970, a remote access interface 974, and a bus interface 978. The one or more processors 961 may be configured to run a management application 964, a terminal application 966, and an NVMe-MI driver 968. The interconnect interface 970 may be configured to implement a PCIe interconnect.

The bus interface 978 at the second host 962 may be configured to communicate with the bus interface 980 at the device through a management bus such as System Management Bus (SMBus) and/or Inter-Integrated Circuit (I2C) bus. This management bus connection may enable the management application 964 to manage one or more administrative aspects of the device 904 such as configuration, system startup, system reset, firmware updates and/or upgrades, power monitoring and/or management, and/or the like. The remote access interface 974 may enable a user to access the one or more processors 961 through a remote access connection 976 using an interface and/or protocol such as Ethernet, TCP/IP, RDMA, ROCE, FibreChannel, InfiniBand, and/or the like.

The NVMe-MI driver 968 at the second host 962 may include a portion 969 that may be integral with, or implemented in a similar manner as, the driver 434 illustrated in FIG. 4. Thus, in addition to, or as an alternative to, the management bus 982, the one or more processors 961 in the second host 962 may access the device operating system 918 through the PCIe fabric 972 and/or 910 using the NVMe-MI protocol.

The terminal application 966 may also access the device operating system 918 through the PCIe fabric 972 and/or 910 using the NVMe-MI protocol. Moreover, if the remote access interface 974 is configured to access the terminal application 966, a user may remotely access the device operating system 918 through the PCIe fabric using the NVMe-MI protocol. Thus, the user may access some or all of the features enabled by the operating system 918 as described above.

In some embodiments, a switch may be located at the intersection of the fabric 910 and 972. Alternatively, the fabric 972 may connect to a separate interconnect port of the device 904. Although the embodiment illustrated in FIG. 9 is shown with two hosts, in other embodiments, only one of the hosts may be included, or additional hosts may be included.

Figure 10:
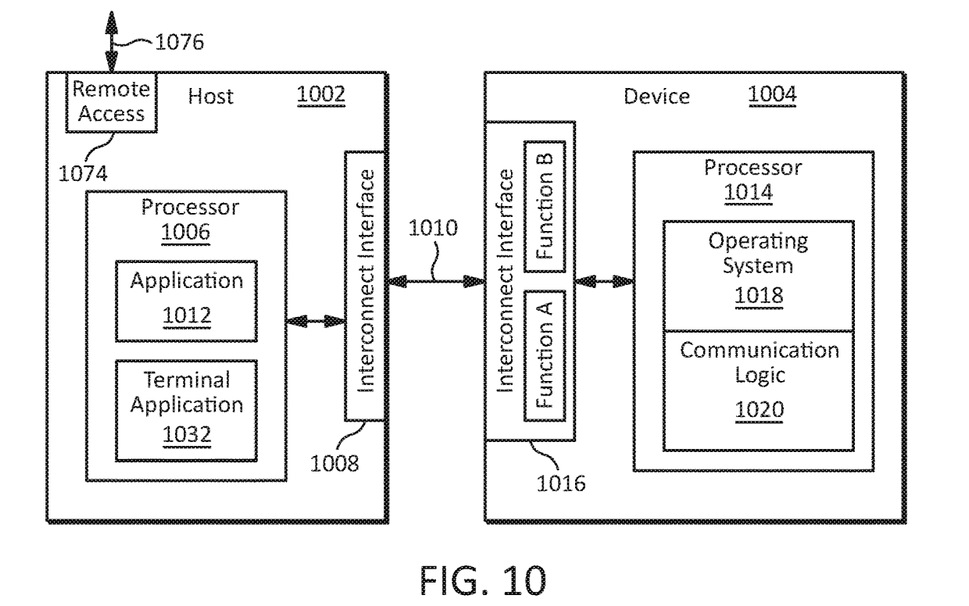
FIG. 10 illustrates an embodiment of a system that may provide a user with remote access to an embedded operating system of a device in accordance with example embodiments of the disclosure.

FIG. 10 illustrates an embodiment of a system that may provide a user with remote access to an embedded operating system of a device in accordance with example embodiments of the disclosure. The system illustrated in FIG. 10 may include components similar to those illustrated in FIG. 3 in which references numerals ending in the same digits may indicate components that may perform similar functions. However, in the embodiment illustrated in FIG. 10, the host 1002 may include a remote access interface 1074. The remote access interface 1074 may enable a user to access the one or more processors 1006 through a remote access connection 1076 using an interface and/or protocol such as Ethernet, TCP/IP, RDMA, ROCE, FibreChannel, Infini-Band, and/or the like. Moreover, if the remote access interface 1074 is configured to access the terminal application 1032, a user may remotely access the operating system 1018 of the device 1004 through the PCIe fabric using the NVMe-MI protocol. Thus, the user may remotely access some or all of the features exposed by the communication logic 1020 as described above.

In some embodiments, one or more of the devices disclosed herein may be implemented as a storage device. Any such storage devices may be implemented in any form factor such as 3.5 inch, 2.5 inch, 1.8 inch, M.2, Enterprise and Data Center SSD Form Factor (EDSFF), NF1, and/or the like, using any connector configuration such as Serial ATA (SATA), Small Computer System Interface (SCSI), Serial Attached SCSI (SAS), U.2, and/or the like.

Any of the devices disclosed herein may be implemented entirely or partially with, and/or used in connection with, a server chassis, server rack, dataroom, datacenter, edge datacenter, mobile edge datacenter, and/or any combinations thereof.

Figure 11:
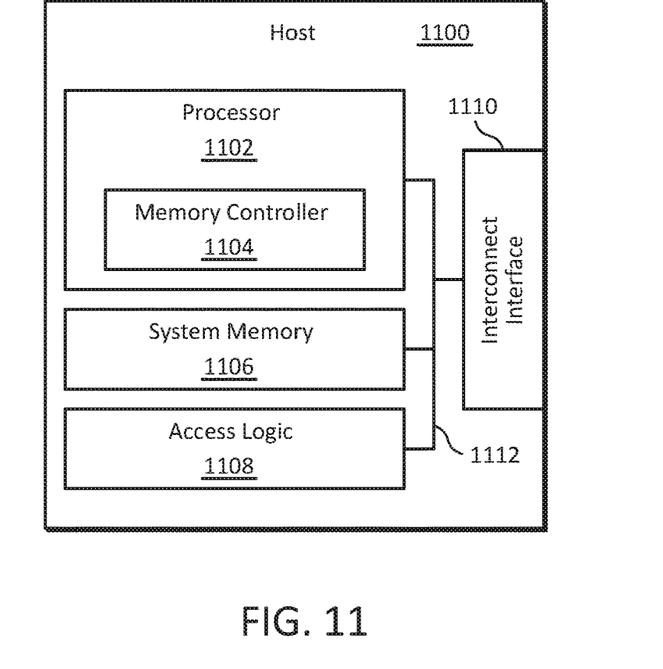
FIG. 11 illustrates an example embodiment of a host apparatus that may be used to provide a user with access to an embedded operating system of a device through an interconnect in accordance with example embodiments of the disclosure.

FIG. 11 illustrates an example embodiment of a host apparatus that may be used to provide a user with access to a device operating system through an interconnect in accordance with example embodiments of the disclosure. The host apparatus 1100 illustrated in FIG. 11 may include a processor 1102, which may include a memory controller 1104, a system memory 1106, access logic 1108, and/or an interconnect interface 1110, which may be implemented, for example using CXL. Any or all of the components illustrated in FIG. 11 may communicate through one or more system buses 1112. In some embodiments, one or more of the components illustrated in FIG. 11 may be implemented using other components. For example, in some embodiments, the access logic 1108 may be implemented by the processor 1102 executing instructions stored in the system memory 1106 or other memory. In some embodiments, the access logic 1108 may implement a terminal application, a device driver, and/or the like to enable a user to access a device operating system through an interconnect.

Figure 12:
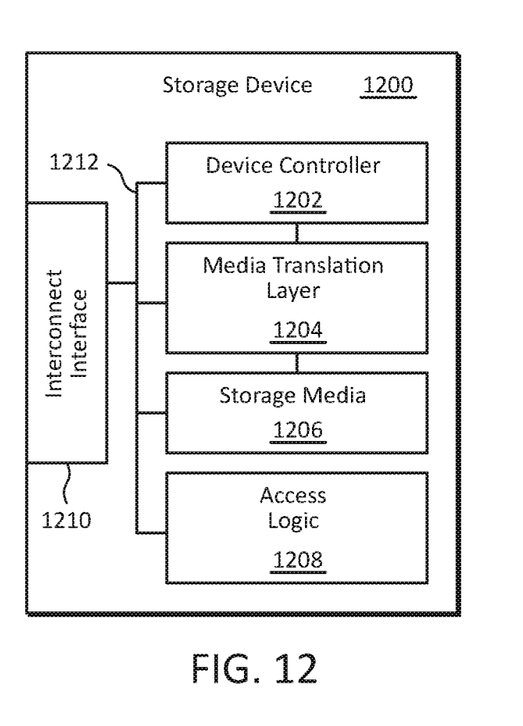
FIG. 12 illustrates an example embodiment of a storage device that may be used to provide a user with access to a device program in accordance with example embodiments of the disclosure.

FIG. 12 illustrates an example embodiment of a storage device that may be used to provide a user with access to a device program in accordance with example embodiments of the disclosure. The storage device 1200 may include a device controller 1202, a media translation layer 1204, a storage media 1206, access logic 1208, and an interconnect interface 1210. The components illustrated in FIG. 12 may communicate through one or more device buses 1212. In some embodiments that may use flash memory for some or all of the storage media 1206, the media translation layer 1204 may be implemented partially or entirely as a flash translation layer (FTL). In some embodiments, the storage device 1200 illustrated in FIG. 12 may be used to implement any of the device-side functionality relating to providing a user with access to a device terminal through an interconnect disclosed herein. For example, in some embodiments, the access logic 1208 may implement communication logic (e.g., one or more terminal support drivers) to enable a user to access an operating system running on the storage device 1200 through an interconnect. In some other embodiments, the storage device 1200 may alternatively or additionally be implemented as any other type of device such as an accelerator, NIC, and/or the like.

Any of the functionality described herein, including any of the host functionality, device functionally, and/or the like described above may be implemented with hardware, software, or any combination thereof including combinational logic, sequential logic, one or more timers, counters, registers, state machines, volatile memories such as DRAM and/or SRAM, nonvolatile memory and/or any combination thereof, CPLDs, FPGAs, ASICs, CPUs including CISC processors such as x86 processors and/or RISC processors such as ARM processors, GPUs, NPUs, and/or the like, executing instructions stored in any type of memory. In some embodiments, one or more components may be implemented as a system-on-chip (SOC).

Figure 13:
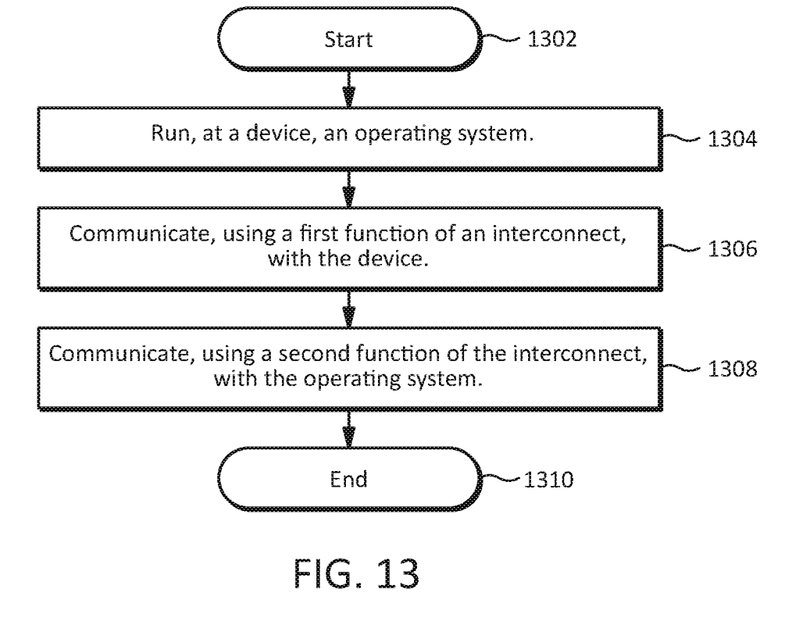
FIG. 13 illustrates an embodiment of a method for providing a user with access to an embedded operating system of a device in accordance with example embodiments of the disclosure.

FIG. 13 illustrates an embodiment of a method for providing a user with access to a device terminal in accordance with example embodiments of the disclosure. The method may begin at operation 1302. At operation 1304, the method may run, at a device, an operating system. For example, a device such as a storage device, an accelerator, a NIC, and/or the like may run an embedded operating system. At operation 1306, the method may communicate, using a first function of an interconnect, with the device. For example, a device controller may be configured as function 0 of a PCIe interconnect. At operation 1308, the method may communicate, using a second function of the interconnect, with the operating system. For example, the terminal may be configured as function 1 of a PCIe interconnect. The method may end at operation 1310.

The embodiment illustrated in FIG. 13, as well as all of the other embodiments described herein, are example operations and/or components. In some embodiments, some operations and/or components may be omitted and/or other operations and/or components may be included. Moreover, in some embodiments, the temporal and/or spatial order of the operations and/or components may be varied. Although some components and/or operations may be illustrated as individual components, in some embodiments, some components and/or operations shown separately may be integrated into single components and/or operations, and/or some components and/or operations shown as single components and/or operations may be implemented with multiple components and/or operations.

Some embodiments disclosed above have been described in the context of various implementation details, but the principles of this disclosure are not limited to these or any other specific details. For example, some functionality has been described as being implemented by certain components, but in other embodiments, the functionality may be distributed between different systems and components in different locations and having various user interfaces. Certain embodiments have been described as having specific processes, operations, etc., but these terms also encompass embodiments in which a specific process, operation, etc. may be implemented with multiple processes, operations, etc., or in which multiple processes, operations, etc. may be integrated into a single process, step, etc. A reference to a component or element may refer to only a portion of the component or element. For example, a reference to a block may refer to the entire block or one or more subblocks. The use of terms such as "first" and "second" in this disclosure and the claims may only be for purposes of distinguishing the things they modify and may not indicate any spatial or temporal order unless apparent otherwise from context. In some embodiments, a reference to a thing may refer to at least a portion of the thing, for example, "based on" may refer to "based at least in part on," and/or the like. A reference to a first element may not imply the existence of a second element. The principles disclosed herein have independent utility and may be embodied individually, and not every embodiment may utilize every principle. However, the principles may also be embodied in various combinations, some of which may amplify the benefits of the individual principles in a synergistic manner.

The various details and embodiments described above may be combined to produce additional embodiments according to the inventive principles of this patent disclosure. Since the inventive principles of this patent disclosure may be modified in arrangement and detail without departing from the inventive concepts, such changes and modifications are considered to fall within the scope of the following claims.

The invention claimed is:

1. A method comprising:
  running, at a device, using a processor, a resource controller;
  operating, at the device, using a device controller, a device functionality;
  running, using the resource controller, a program configured to perform a computation on data stored at the device;
  communicating, by at least one host, using a first function of an interconnect interface, with the program, wherein the first function of the interconnect interface communicates as a first logical device; and
  communicating, by at least one host, using a second function of the interconnect interface, with a feature of the resource controller, wherein the second function of the interconnect interface communicates as a second logical device;
  wherein the feature of the resource controller is configured to determine a performance of the program.

2. The method of claim 1, wherein:
  the resource controller comprises communication logic; and
  the communicating with the feature of the resource controller comprises communicating, by at least one host, with the communication logic.

3. The method of claim 2, wherein:
  the communication logic comprises one or more terminal drivers; and
  the communicating with the communication logic comprises communicating with the one or more terminal drivers using a terminal application.

4. The method of claim 1, wherein the communicating with the feature of the resource controller comprises running a terminal application runs on at least one host.

5. The method of claim 1, wherein the second function of the interconnect interface is configured to operate using the device controller.

6. The method of claim 1, wherein the communicating with the feature of the resource controller comprises communicating, based on a privilege, with the resource controller.

7. The method of claim 1, further comprising controlling, using the second function of the interconnect interface, a program running using the resource controller.

8. The method of claim 7, wherein the program comprises at least one of a debugging program, a tracing program, or a profiling program.

9. The method of claim 1, wherein the communicating with the feature of the resource controller comprises storing, by the device, in a buffer, output data associated with the second function of the interconnect interface.

10. The method of claim 9, wherein the communicating with the feature of the resource controller comprises reading, from the buffer, the output data associated with the second function of the interconnect interface.

11. The method of claim 9, wherein the buffer comprises a ring buffer.

12. The method of claim 9, wherein the output data associated with the second function of the interconnect interface is generated by a program controlled using the second function of the interconnect interface.

13. The method of claim 1, wherein the communicating with the feature of the resource controller provides terminal access to the resource controller.

14. A device comprising:
  an interconnect interface;
  a device functionality;
  at least one control circuit configured to control the device functionality; and
  a processor configured to:
    operate a resource controller;
    run a program using the resource controller, wherein the program is configured to perform a computation using data accessed at the device; and
    access a feature of the resource controller, wherein the feature of the resource controller is configured to determine a performance of the program;
  wherein the program is configured to communicate using a first function of the interconnect interface, wherein the first function of the interconnect interface communicates as a first logical device; and
  wherein the feature of the resource controller is configured to communicate, using a second function of the interconnect interface, wherein the second function of the interconnect interface communicates as a second logical device.

15. The device of claim 14, further comprising a buffer configured to:
- store data associated with the second function of the interconnect interface; and
- send the data associated with the second function of the interconnect interface using the second function of the interconnect interface.

16. The device of claim 15, wherein the resource controller comprises communication logic configured to communicate using the second function of the interconnect interface.

17. A system comprising:
- a device comprising:
  - an interconnect interface; and
  - a device processor configured to operate a resource controller; and
- at least one host comprising at least one host processor configured to:
  - communicate, using a first function of the interconnect interface, with the device, wherein the first function of the interconnect interface is configured to communicate as a first logical device; and
  - communicate, using a second function of the interconnect interface, with the resource controller, wherein the second function of the interconnect interface is configured to communicate as a second logical device;

wherein the device processor is further configured to:
- run a program using the resource controller, wherein the program is configured to communicate using the first function of the interconnect interface and perform a computation using data accessed at the device; and
- access a feature of the resource controller, wherein the feature of the resource controller is configured to communicate using the second function of the interconnect interface and determine a performance of the program.

18. The system of claim 17, wherein the at least one host comprises:
- a first host comprising a first one of the at least one host processor configured to communicate, using the first function of the interconnect interface, with the device; and
- a second host comprising a second one of the at least one host processor configured to communicate, using the second function of the interconnect interface, with the resource controller.

19. The system of claim 18, wherein the first host comprises a management controller.

20. The system of claim 17, wherein the at least one host processor is configured to provide communication between the resource controller and a user.

* * * * *